US006680783B1

(12) United States Patent
Pierce et al.

(10) Patent No.: US 6,680,783 B1
(45) Date of Patent: Jan. 20, 2004

(54) METHOD FOR PREVENTING THE DUPLICATE PRINTING OF AN IBIP INDICIUM

(75) Inventors: Perry A. Pierce, Darien, CT (US); Brian M. Romansky, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/451,598

(22) Filed: Nov. 30, 1999

(51) Int. Cl.[7] ................................................ G06K 15/00
(52) U.S. Cl. ........................................ 358/1.14; 705/60
(58) Field of Search ......................... 358/1.1, 1.6, 1.13, 358/1.14, 1.16, 1.18; 705/410, 401, 404, 405, 416, 60, 51, 64, 62

(56) References Cited

U.S. PATENT DOCUMENTS 6,055,520 A * 4/2000 Heiden et al. .............. 705/410

* cited by examiner

*Primary Examiner*—Arthur G. Evans
(74) *Attorney, Agent, or Firm*—Charles R. Malandra, Jr.; Angelo N. Chaclas

(57) ABSTRACT

A method for printing an indicium with a printer coupled to a personal computer includes the steps of collecting indicium data in memory of the PC, generating an indicium bar code relating to the indicium data, creating in the PC memory a printable image of a valid indicium including the indicium bar code, printing the printable image, and destroying the printable image in the PC memory as soon as the printable image has been printed. Messages of the PC operating system can be monitored for printing activity such that the printable image can be modified after a first copy of the printable image has been printed. The step of creating a printable image includes determining if more than one copy of the indicium is to be printed, and changing the number of copies to be printed to one when more than one copy is determined. The step of creating a printable image renders an indicium image to a memory device context. The printable image can be destroyed by overwriting the printable image with other information.

7 Claims, 4 Drawing Sheets

METHOD FOR PREVENTING THE DUPLICATE PRINTING OF AN IBIP INDICIUM

RELATED APPLICATIONS

The present application is related to the following U.S. patent applications Ser. Nos. 08/575,106 (which issued as U.S. Pat. No. 5,625,694), Ser. No. 08/575,107 (which issued as U.S. Pat. No. 5,781,438); (which issued as U.S. Pat. No. 5,835,604); (which issued as U.S. Pat. No. 5,742,683); (which issued as U.S. Pat. No. 5,793 867), 08/574,746, 08/574,745, 08/575,110, 08/574,743, 08/575,112, 08/575, 109, which issued as U.S. Pat. No. 5,835,689) 08/575,104, and 08/574,749 (which issued as U.S. Pat. No. 5,590,198), all filed Dec. 18, 1995, and assigned to the assignee of the present invention., and U.S. patent application Ser. No. 08/922,875, filed concurrently herewith.

FIELD OF THE INVENTION

The present invention relates generally to a method for printing a postage indicium and, more particularly, to such method for printing an IBIP indicium using a personal computer.

BACKGROUND OF THE INVENTION

The Information-Based Indicia Program (IBIP) is a distributed trusted system proposed by the United States Postal Service (USPS) to retrofit and augment existing postage meters using new technology known as information-based indicia. The program relies on digital signature techniques to produce for each envelope an indicium whose origin cannot be repudiated. IBIP is expected to support new methods of applying postage in addition to, and eventually in lieu of, the current approach, which typically relies on a postage meter to mechanically print indicia on mailpieces. IBIP requires printing a large, high density, two-dimensional (2-D) bar code on a mailpiece. The 2-D bar code encodes information and is signed with a digital signature.

The USPS has published draft specifications for IBIP. The INFORMATION BASED INDICIA PROGRAM (IBIP) INDICIUM SPECIFICATION, dated Jun. 13, 1996, ("IBIP Indicium Specification") defines the proposed requirements for a new indicium that will be applied to mail being processed using IBIP. The INFORMATION BASED INDICIA PROGRAM POSTAL SECURITY DEVICE SPECIFICATION, dated Jun. 13, 1996, ("IBIP PSD Specification") defines the proposed requirements for a Postal Security Device (PSD) that will provide security services to support the creation of a new "information based" postage postmark or indicium that will be applied to mail being processed using IBIP. The INFORMATION BASED INDICIA PROGRAM HOST SYSTEM SPECIFICATION, dated Oct. 9, 1996, defines the proposed requirements for a host system element of IBIP ("IBIP Host Specification"). The specifications are collectively referred to herein as the "IBIP Specifications". IBIP includes interfacing user (customer), postal and vendor infrastructures which are the system elements of the program.

The user infrastructure, which resides at the user's site, comprises a postage security device (PSD) coupled to a host system. The PSD is a secure processor-based accounting device that dispenses and accounts for postal value stored therein. The host system (Host) may be a personal computer (PC) or a meter-based host processor.

The IBIP Indicium Specification provides requirements for the indicium that consists of both human-readable data and PDF-417 bar code data. The human-readable information includes an originating address, including the 5-digit ZIP Code of the licensing post office, PSD ID/Type number, date of mailing and amount of the applied postage. The bar code region of the indicium elements includes postage amount, PSD ID, customer ID, date of mailing, originating address, destination delivery point identification, ascending and descending registers and a digital signature.

An integrated mailing system is subject to open system requirements if it includes a computer interfaced to the meter and it prepares mailpiece fonts or labels that include both the destination address and the indicium. The integrated system is an open system even if different printers apply the address and the indicium. If the mailing system satisfies such criteria, the USPS considers the "meter" to be an open system peripheral device that performs the dual functions of printing the indicia and interfacing the PSD to the open host. The integrated mailing system must be approved by the USPS according to open system criteria.

The IBIP Host Specification sets forth the requirements for a Host in an open system. The Host produces the mailpiece front including the return address (optional), the delivery address (required), the Facing Identification Mark (FIM), and the indicium as an integral unit. The Host may print this unit on the actual mailpiece stock or label(s) for later attachment to the mailpiece. The Host provides the user with an option to omit the FIM (e.g., when the FIM is preprinted on envelopes). The Host produces standardized addresses, including standard POSTNET delivery point bar code, for use on the mailpiece. The Host verifies each address at the time of mailpiece creation. The Host then creates the indicium and transmits it to the printer.

It is expected that once IBIP is launched, the volume of meters will increase significantly when the PC-based meters are introduced. Such volume increase is expected in the small office and home office (SOHO) market. The IBIP Specifications address and resolve issues which minimize if not eliminate USPS risks regarding security and fraud. However, as with any system implemented on a non-secure device, such as a personal computer, implementation of an IBIP system may have inherent security weaknesses that could be exploited by sophisticated users intent on defrauding the USPS.

For example, there is potential for abuse by sophisticated PC users concerning the printing of multiple copies of an IBIP indicium because of various unsecured aspects of the PC operating system and the printer which prints the indicium. Although the IBIP verification process could detect such misuse, it is desired to prevent such misuse from occurring before such verification process is in place.

SUMMARY OF THE INVENTION

An IBIP open system postage meter evidences postage payment by printing on a mailpiece an IBIP indicium created by the Host PC and printed by a printer coupled to the Host PC. Both the Host PC and the printer are unsecured devices. The Host PC includes application software that is provided by a meter manufacturer, such as Pitney Bowes Inc. The application software requests postage from the PSD, creates an indicium when postage is returned with other information from the PSD, and requests the printer to print the indicium. It has been found that conventional safeguards in such application software, which are intended to prevent multiple copies of an indicium, could be circumvented whereby multiple copies of an indicium may be printed. For example, one method that could be used to bypass such safeguards is to configure the operating system on a Host PC to print multiple copies of all documents that are printed. Thus, when an indicia is created, several identical copies will be printed.

In accordance with the present invention, additional safeguards are added to discourage or prevent users from misusing the IBIP meter to create multiple copies of an indicium. The present invention encompasses a method that makes it possible for a metering application in the PC to prevent the printing of multiple copies of a document through the PC operating system. In operating systems, such as Microsoft Windows 3.x, Windows 95, and Windows NT, this is not a standard feature. The application must actively monitor the system messages to detect that its data is being printed more than once. If this activity is detected, the application can take action to ensure that the duplicate indicia images are invalid.

This invention further provides that the data associated with a valid indicium be destroyed as soon as a single printable image has been rendered. This process is entirely under the control of the application. Once a printable graphic image has been created, the data object that contains the digital signature associated with that indicium can be actively deleted from memory by writing over the region of RAM in which it was stored. This process will hinder attempts to create multiple copies of an indicium by monitoring the presence of this data in memory.

The present invention provides a method for printing an indicium with a printer coupled to a personal computer. The method includes the steps of collecting indicium data in memory of the PC, generating an indicium bar code relating to the indicium data, creating in the PC memory a printable image of a valid indicium including the indicium bar code, printing the printable image, and destroying the printable image in the PC memory as soon as the printable image has been printed. Messages of the PC operating system can be monitored for printing activity such that the printable image can be modified after a first copy of the printable image has been printed. The step of creating a printable image includes determining if more than one copy of the indicium is to be printed, and changing the number of copies to be printed to one when more than one copy is determined. The step of creating a printable image renders an indicium image to a memory device context. The printable image can be destroyed by overwriting the printable image with other information.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
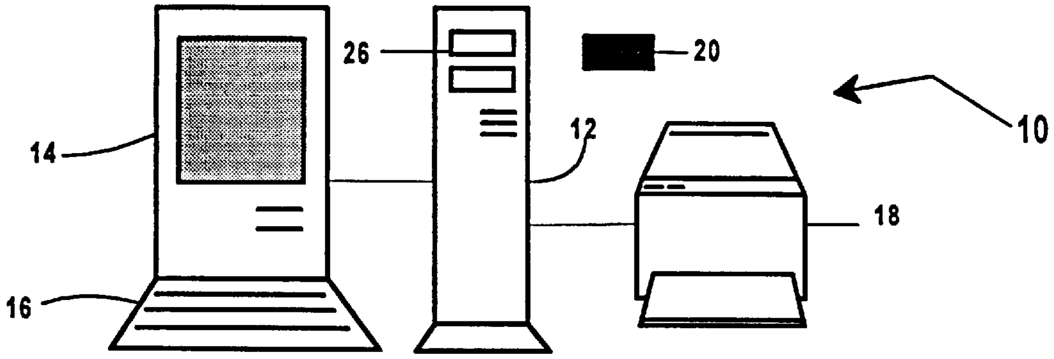
FIG. 1 is a block diagram of a prior art open metering system

In describing the present invention, reference is made to the drawings, wherein there is seen in FIG. 1 an IBIP open metering system, also referred to herein as a PC meter system, generally referred to as 10, comprising a conventional personal computer (PC) 12 configured to operate as a host to a peripheral metering device, referred to by the IBIP as a PSD, generally referred to as 20, in which postage funds are stored. IBIP open metering system 10 uses PC 12 and its printer to print postage on envelopes at the same time it prints a recipient's address or to print labels for pre-addressed return envelopes or large mailpieces. It will be understood that although the preferred embodiment of the present invention is described as a postage metering system, the present invention is applicable to any value metering system that includes transaction evidencing using an unsecured printer.

The IBIP open metering system 10 includes a Host PC 12, a display 14, a keyboard 16, and an unsecured digital printer 18, which is preferably a laser or inkjet printer. PC 12 includes a conventional processor, such as the Pentium processors manufactured by Intel, and conventional hard drive, floppy drive(s) 26, and memory. PSD 20 is a microprocessor-based secure encryption device for postage funds management, signature of postal data and traditional accounting functions. PC meter system 10 may also include an optional modem (not shown) by which the Host can communicate with a Postal Service or a postal authenticating vendor for recharging funds (debit or credit). In an alternate embodiment the modem may be located in PSD 20.

Figure 2:
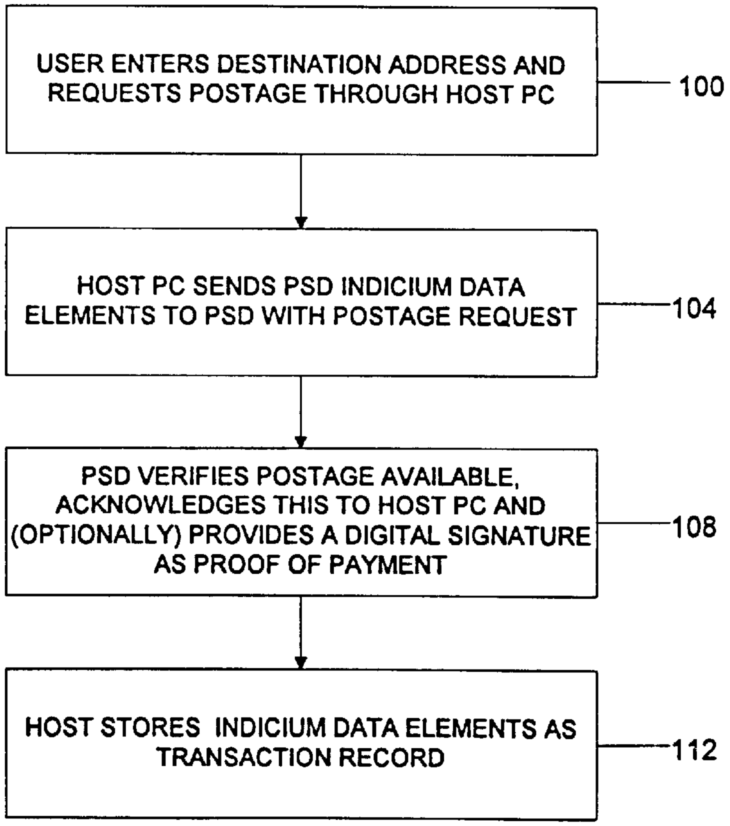
FIG. 2 is a flow chart of creation of an indicium for a mailpiece.

Referring now to FIG. 2, there is seen a method for generating an IBIP indicium. At step 100, the user enters a destination address and request postage therefor. At step 104, the Host sends to the PSD indicium data elements to the PSD with a request for postage. At step 108, the PSD verifies the requested postage is available, debits the postage account and sends the signed indicium data elements to the Host. As described below, the preferred in the preferred embodiment of the present invention, the PSD does not sign the indicium data elements until the indicium is about to be printed. However, an alternate embodiment provides the PSD signing the indicium data elements at this step. At step 112, the Host stores the signed indicium data as a transaction record in a transaction record file on the PC hard drive. At this point the Host is ready to generate the indicium bit map for printing.

It has been found that a software solution for printing postage on a personal computer is limited in its ability to prevent a motivated user from printing duplicate images of valid indicia. Although duplicates created through printing duplicate images can be detected by the IBIP verification system, it is anticipated that the cost of detecting and prosecuting a large number of mailers for creating duplicate mailpieces would be prohibitively high. Therefore, it is desired that equipment manufacturers design their products to make it difficult for mailers to create duplicate mailpieces.

The present invention provides two primary mechanisms for enforcing the restriction on the creation of multiple copies of an indicium. First, the present invention provides that the metering software, which is resident in the PC, ensures that the operating system will produce only one print before the printable image is generated. Second it actively destroys all source data related to an indicium as soon as the printable image has been created.

Most modem desktop operating systems provide advanced mechanisms for handling printing. Examples include Microsoft Window™ and Apple's Macintosh™ OS. In these environments an application must draw an image to a region of memory called a device context (referred to herein as "memory device context") which is then passed to the operating system for printing. Once the image has been drawn the operating system may print multiple copies of the image without informing the application. In accordance with the present invention, this can be prevented by having the application detect the number of copies that the operating system plans to make before printing and refuse to create an indicium image if this value is not set to one.

In the case of Microsoft Windows, this can be accomplished by calling Windows API function GetPrinterDeviceDefaults( ) which has the following C prototype:

BOOL GetPrinterDeviceDefaults( PRINTDLG* pPrintDIg).

The parameter pPrintDIg is a structure which has a member called nCopies. The value of this member indicates the number of copies the printer driver will print for the current request. The metering software should only draw an indicium image if this value is 1.

Actively destroying the indicium data after drawing the image of an indicium guarantees that the data can not be used to create a second image. This is an additional step which significantly enhances the enforcement of the requirement that; only one copy of each indicium be printed. It is recommended that the data fields be actively overwritten with random data after an image has been created. It is noted that the overwritten data fields are not the transaction records stored on the hard drive of the PC as an historical record of transaction that have transpired.

Figure 3:
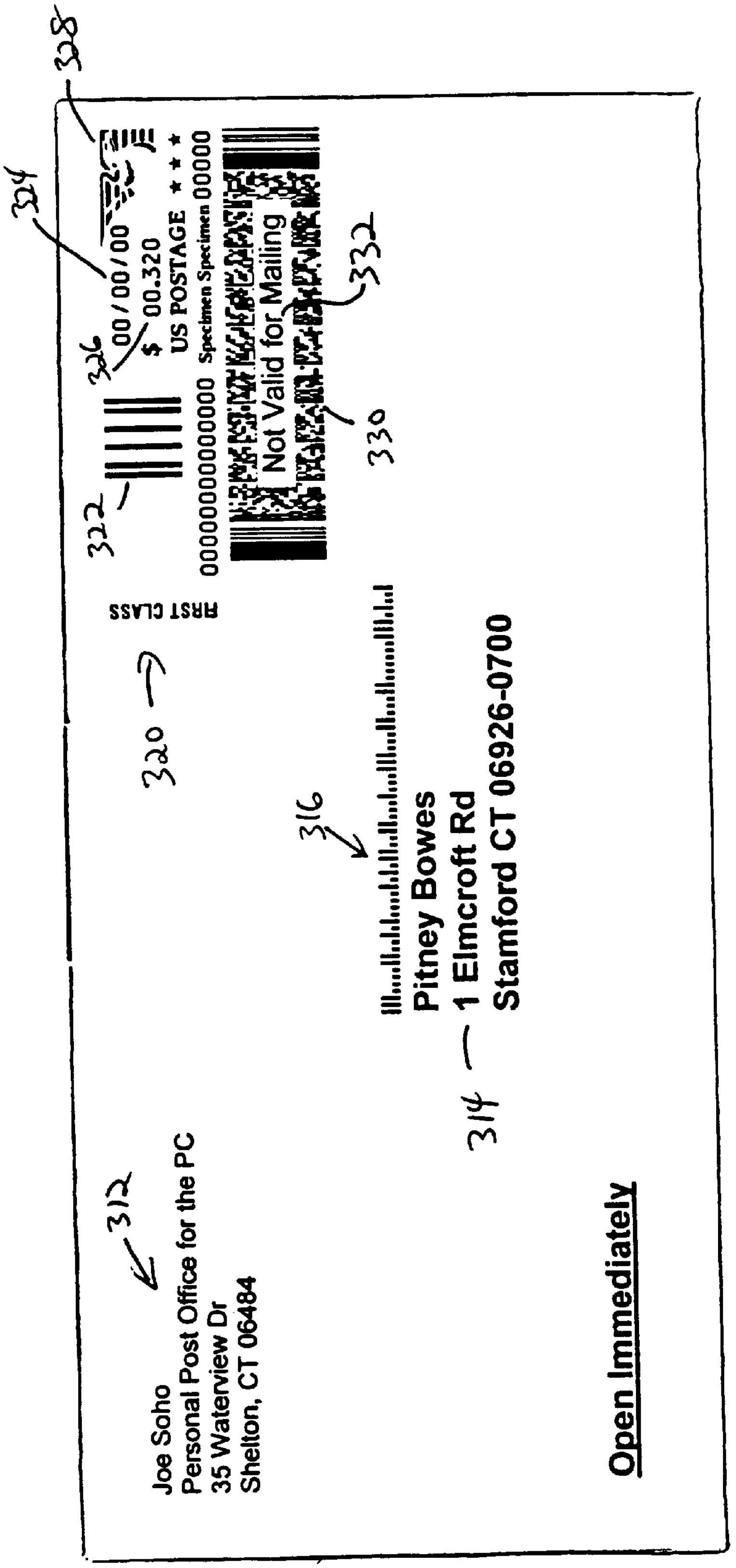
FIG. 3 is an envelope printed with a sample IBIP indicium.

Referring now to FIG. 3, an envelope 300 with an IBIP a sample PA indicium printed is shown. Envelope 300 includes a return address 312, destination address 314, including POSTNET bar code 316, and IBIP indicium 320. The IBIP indicium 320 includes FIM 322, date 324, postage amount 326, fixed graphics 328 and PDF-417 bar code 330 with a message "NOT VALID FOR MAILING" 332 superimposed thereon.

Figure 4:
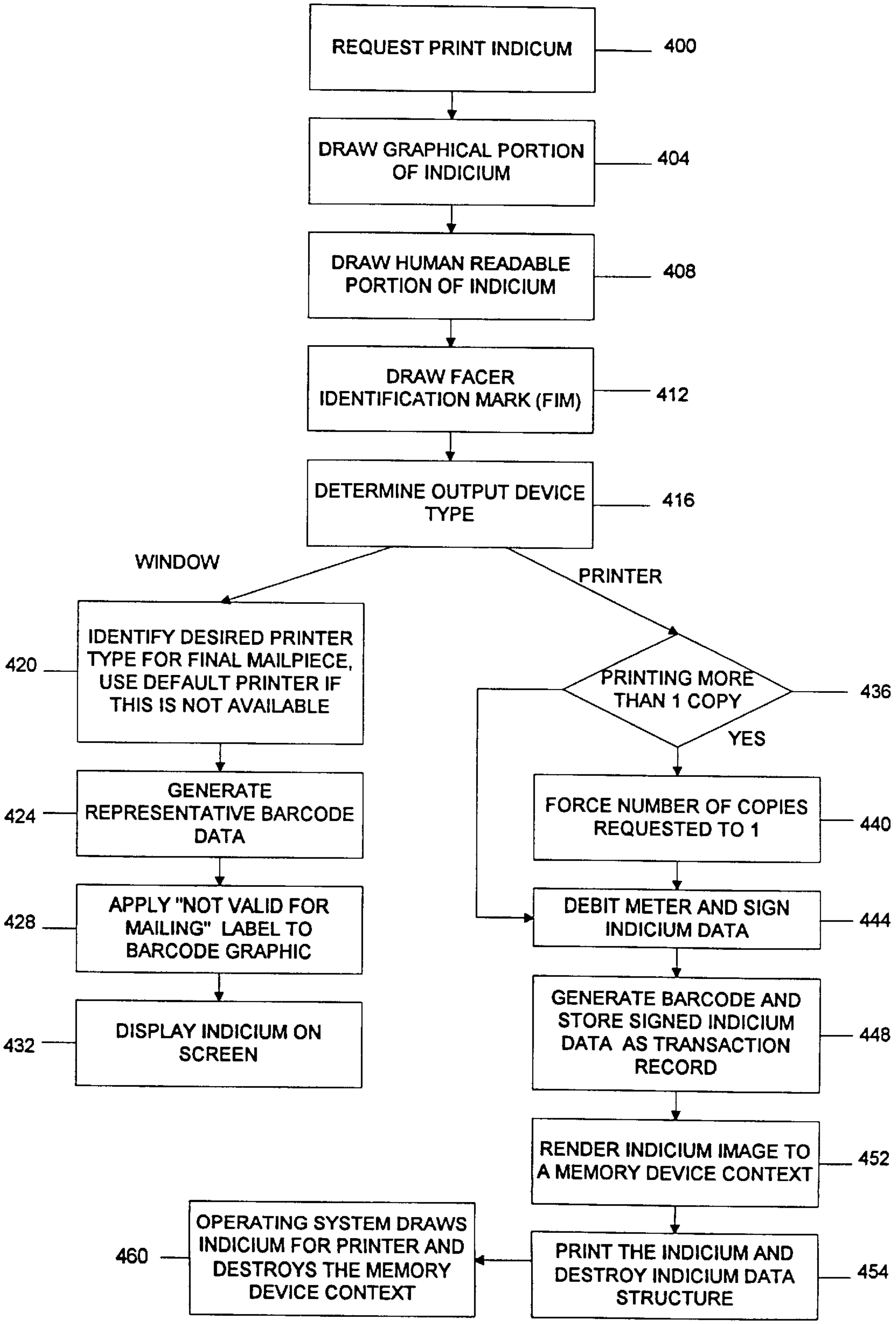
FIG. 4 is a flow chart for the preferred method for printing an indicium in an IBIP open metering system.

Referring now to FIG. 4, the method of displaying the indicium before printing is shown. As used herein the term "drawn" means the bit mapped image is created. At step 400, a request to print the indicium is initiated by 10 the user. At step 404, the fixed graphics portion, for example an eagle, of the indicium is drawn. It will be understood by those skilled in the art that the fixed graphics portion may be drawn once and stored for repeated use. At step 408, the variable, i.e. human readable, portion of the indicium is drawn. At step 412, the FIM is drawn. Before the PDF-417 bar code is drawn it is determined, at step 416, if the indicium will be output to the display or to the printer. If output to the display, then at step 420, the desired printer type that will be used to print the mailpiece is identified. A default printer of the Host can be used automatically unless another printer is selected. For this step, Identifying the type of printer that will be used to print the mailpiece is important from a WYSWYG view. It has been found that the desired bar code module size for IBIP indicia is optimally determined based on the quality of the paper on which it is printed and the type of printer used to print the indicia. See U.S. Patent Application Serial No. 08/771,992,now U.S. Pat. No. 5,871,288, entitled METHOD FOR CUSTOMER SELECTABLE MODULE SIZE FOR AN INFORMATION BASED INDICIA, filed Dec. 23, 1996 and assigned to the assignee of the present invention.

At step 424, the Host generates a representative bar code. Preferably, the representative bar code is generated and drawn from sample indicium data that would fail a verification scan but which has the dimensions and appearance of an IBIP barcode. However, it is noted that the representative bar code can be generated from the actual indicium data because of the following step. At step 428, a message, such as "Not Valid for Mailing" is applied to the bar code bit map so as to overlay, i.e., replace, a section of the representative bar code previously generated. Finally, at step 432, the drawn indicium, including bar code graphic with overlay, is displayed as a print preview screen of the Host.

If at step 416 the indicium is to be output to the printer, then at step 436 a check is made to determine if the operating system of the Host PC has been configured to print more than one copy of the indicium. If more than one copy is to be printed, then at step 440, the application software in the Host PC will force the operating system to print only one copy of the indicium. Then at step 444, or if the operating system was printing only one copy at step 436, the Host PC sends a message to the PSD that the indicium is about to be printed and the PSD debits the available postage amount for the postage value of the indicium. At step 448, the application software generates the PDF-417 barcode and stores the signed indicium data as a transaction record on the hard drive. At step 452, the application software renders the indicium image to a memory device context. At step 454, the application software destroys the indicium data structure, i.e. the bit mapped image of the indicium, that has been drawn in the memory of the Host PC. Finally at step 460 the operating system of the PC draws the indicium for the printer to print and destroys the memory device context. It will be understood that the destruction of the indicium data structure and the memory device context can be achieved by writing over the memory containing them with unrelated information or by zeroing the contents of the memory.

Indicium signatures may be created individually or in a batch mode. When created individually it is recommended that the signature be created immediately before the printing of the indicium image. This is referred to as "single envelope" processing. Creating the data immediately before printing will minimize the amount of time during which the valid signature is available for duplication. In some cases timing requirements may require that a batch of indicia be signed before printing begins. These cases would require batch processing of the indicia data before printing begins. See U.S. patent application Ser. No. 08/575,104, previously noted.

Figure 5:
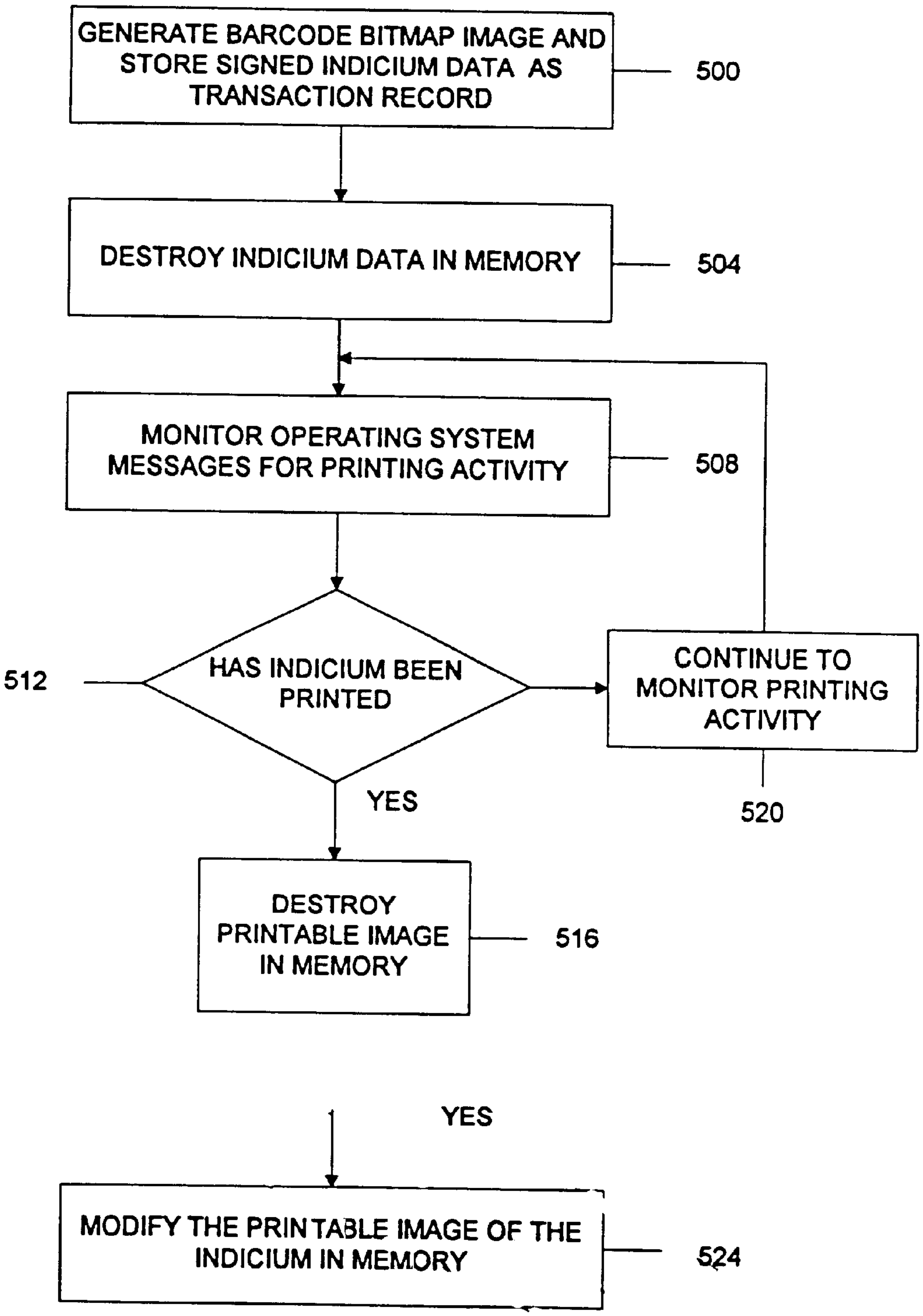
FIG. 5 is a flow chart for an alternate method for printing an indicium.

Referring now to FIG. 5, an alternate method is shown for preventing multiple copies of an indicium from being printed by a PC metering system. The alternate method includes steps 400 through 432 from FIG. 4. FIG. 5 begins at step 500, whereat the printer has been determined to be the output device. At step 500, a printable image of a valid indicium is completed, i.e. the barcode is generated and the signed indicium data is stored as a transaction record. At step 504, the application software destroys the indicium data in memory. At step 508, the application software monitors the operating system messages for printing activity. If, at step 512, it is determined that the indicium has been printed, then at step 516, the application software destroys the printable image of the indicium in memory, for example, by modifying the printable image of the indicium in memory the printable image in memory, thus preventing further printing of the indicium printable image. If the indicium has not been printed, then at step 520, the application software continues to monitor the printing of the indicium.

While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

What is claimed is:

1. A method for printing an indicium with a printer coupled to a personal computer (PC), the method comprising the steps of:

generating indicium data in a postal security device coupled to the PC;

sending the indicium data from the postal security device to the PC;

generating an indicium bar code relating to the indicium data;

creating in the PC memory a printable image of a valid indicium including the indicium bar code;

printing the printable image; and destroying the printable image in the PC memory as soon as the printable image has been printed.

2. The method of claim 1 comprising the further steps of:

monitoring messages of the PC operating system for printing activity;

modifying the printable image after a first copy of the printable image has been printed.

3. The method of claim 1 wherein the step of creating a printable image comprises the steps of:

determining if more than one copy of the indicium is to be printed; and changing the number of copies to be printed to one when more than one copy is determined.

4. The method of claim of claim 1 wherein the step of creating a printable image comprises the step of rendering an indicium image to a memory device context.

5. The method of claim 1 wherein the step of destroying comprises the step of overwriting the printable image with other information.

6. The method of claim 4 wherein the step of destroying comprises the step of overwriting the memory device context.

7. The method of claim 1 comprising the further step of debiting postal funds and signing indicium data and storing the signed indicium data in a transaction record before generating the barcode.

* * * * *